Patented May 11, 1926.

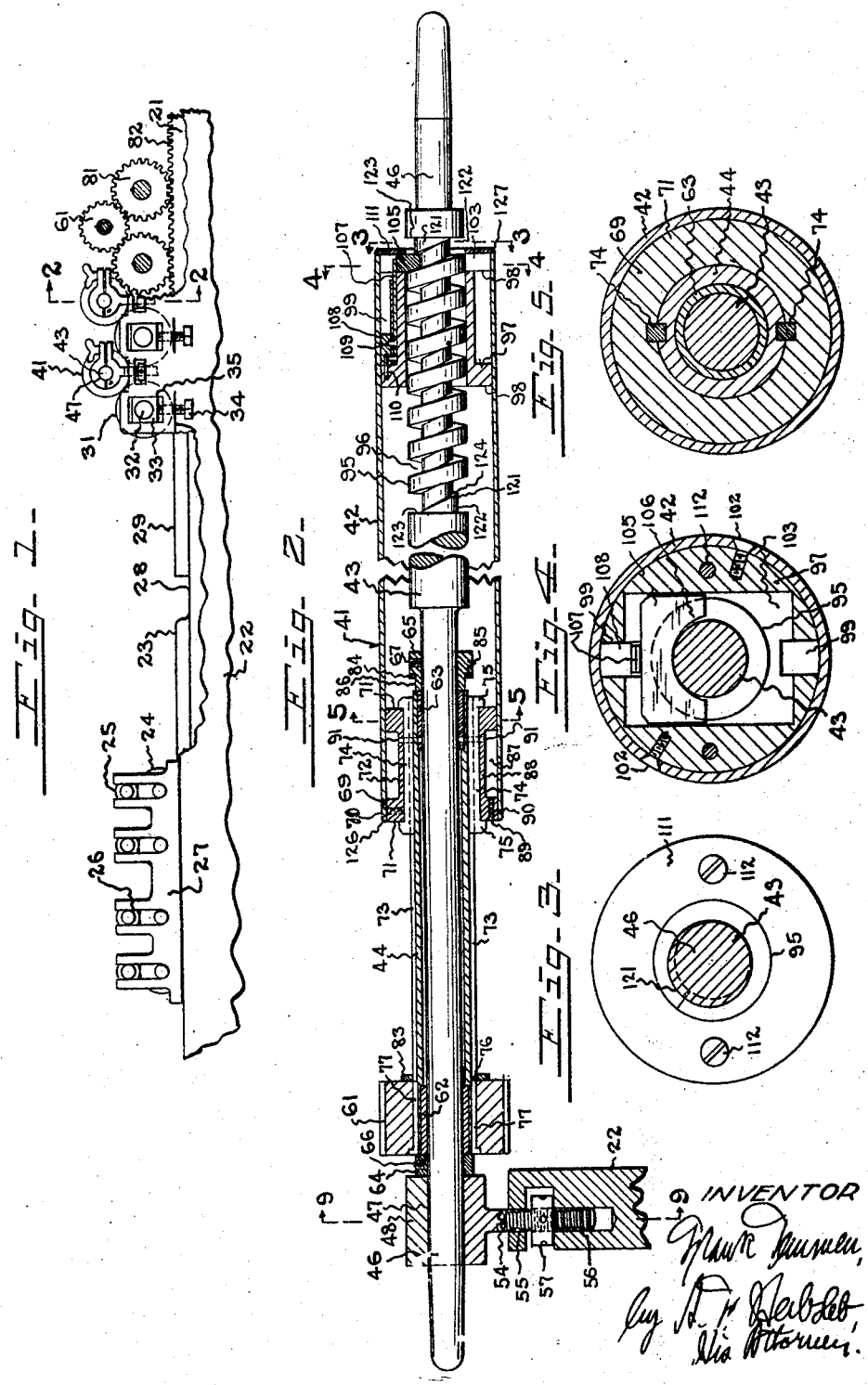

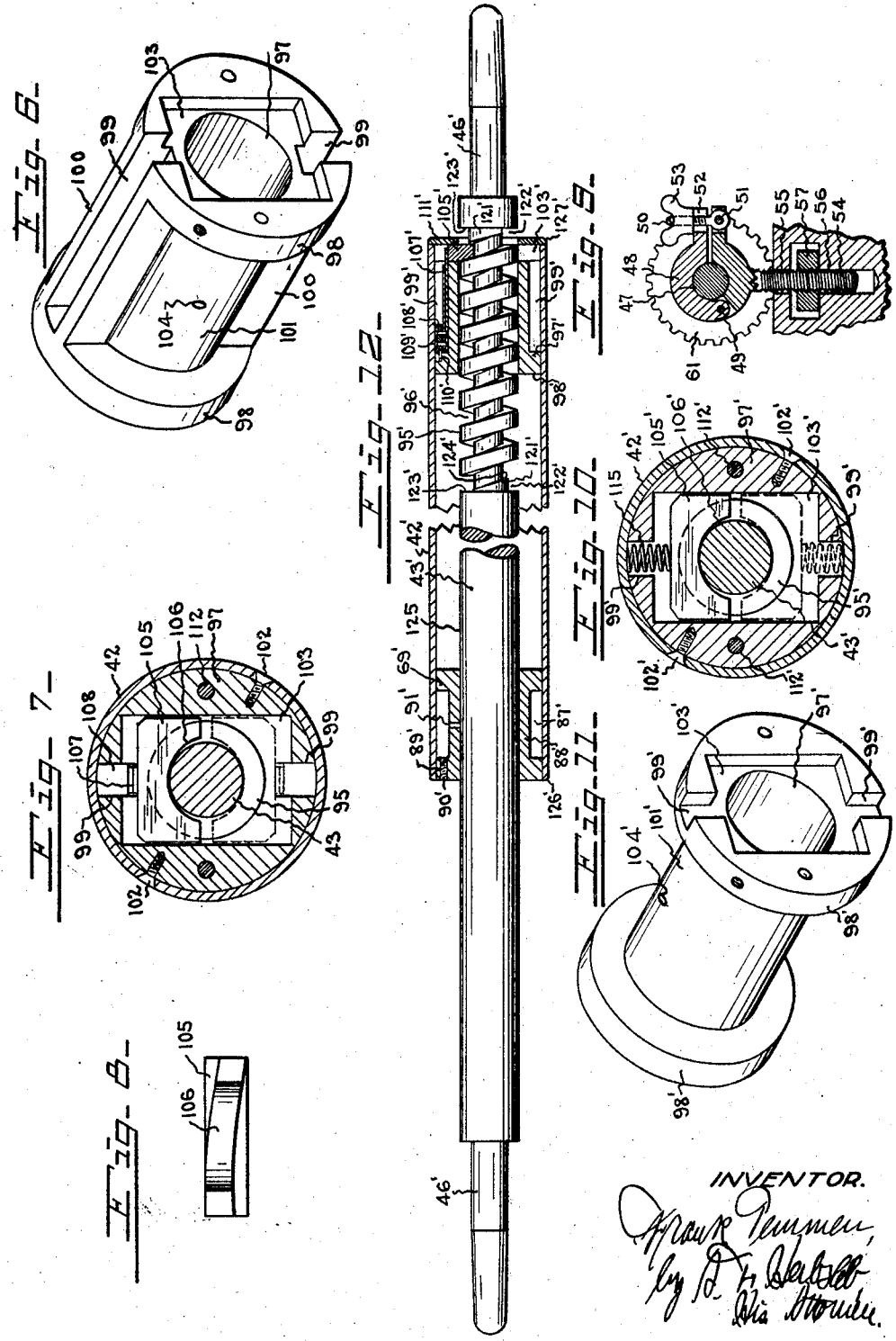

1,584,255

UNITED STATES PATENT OFFICE.

FRANK TEMMEN, OF COVINGTON, KENTUCKY.

INK-DISTRIBUTING ROLLER.

Application filed March 4, 1926. Serial No. 92,276.

My invention relates to ink distributing rollers for use in printing presses, including lithographing presses and the like, and has for its object the provision of an ink distributing roller by means of which accurate, even and minute distribution of the ink is obtained.

My invention is intended for use principally in connection with the form rollers which ink the form or stone prior to the printing operation.

It is the object of my invention to provide a new and improved ink distributing roller by means of which the ink is very evenly distributed on the form for obtaining evenly inked impressions; and, further, to provide novel means for increasing the covering capacity of the ink.

It is the object of my invention further to provide an ink distributing roller with means whereby long reciprocating axial movements are imparted to an ink distributing shell with a minimum of endwise space in the mechanism for its actuation; further, to provide novel means whereby the parts are readily accessible for being readily replaced in case of wear or accident; further, to provide novel driving means for an endwise reciprocating ink distributing roller whereby rotary movement is imparted to the endwise movable roller throughout a great extent of endwise movement thereof; and, further, to provide novel parts and arrangements of parts whereby ease and accuracy of operation are assured.

I have exemplified my invention in connection with a so-called reciprocating bed printing machine.

In the drawings:

Fig. 1 represents a side elevation of an elementary printing press employing a reciprocating bed, partly broken away, having my invention applied thereto.

Fig. 2 is an axial section of my improved ink distributing roller, taken on the line 2—2 of Fig. 1.

Fig. 3 is a cross-section of the same, taken in the plane of the line 3—3 of Fig. 2.

Fig. 4 is a cross-section of the same, taken in the plane of the line 4—4 of Fig. 2.

Fig. 5 is a cross-section of the same, taken in the plane of the line 5—5 of Fig. 2.

Fig. 6 is a perspective view of the bearing in which the shoe is mounted.

Fig. 7 is an exemplifying cross-section of my improved device, showing a shoe and spring at one side of the screw in full lines, and a shoe and spring in assumed position in dotted lines at the other side of the screw.

Fig. 8 is an inner end elevation of the shoe.

Fig. 9 is a cross-section of the clamping means of my improved device, taken in the plane of the line 9—9 of Fig. 2.

Fig. 10 is a cross-section exemplifying a modification of my improved device, showing a modified spring means for the shoe, and showing a shoe and spring at one side of the screw in full lines, and a shoe and spring in assumed position in dotted lines at the other side of the screw.

Fig. 11 is a perspective view of the bearing of this modification, and,

Fig. 12 is an axial section of my ink distributing roller showing a further modification of the same.

Referring to Fig. 1, 21 represents the reciprocating bed of the exemplified printing press, to which reciprocations in the main frame 22 are imparted in opposite linear directions in any well-known or usual manner. The reciprocating bed has thereon an ink distributing table 23, arranged to have ink supplied thereto from a suitable ink fountain, not shown because well-known, and to have the printing ink preliminarily distributed thereon by composition inking rollers 24, and metal inking rollers 25 thereabove, the inking rollers having their shafts mounted in bearing slots 26 of standards 27 secured to the frame of the machine, in usual manner. The reciprocating bed also has thereon a form table 28, on which the printing form or plates or lithographic stone, shown generally at 29, is suitably supported and secured.

Composition form rollers are exemplified at 31, and have the respective ends of their shafts 32 located in bearings 33, adjustably supported on set-screws 34, the bearings being arranged to have vertical movements in slots 35 of the side frame of the machine.

The improved ink distributing rollers which are the subject-matter of my invention are exemplified at 41. One or more of the same may be employed. All of the form rollers are preferably contacted by my improved ink distributing rollers.

In the present exemplification, the ink distributing roller comprises an outer shell 42, which is preferably a steel or other metal shell, and which has the ink applied to its outer periphery. The shell is shown cylindrical in form. A rod 43 is located in the shell. A sleeve 44 is interposed between the shell and the rod.

Means are provided for restraining rotation of said rod. Thus the ends 46 of the rod are received in clamp-bearings 47. Each of the bearings is provided with a cap 48 pivoted at 49 to the body of the bearing. A threaded bolt 50, is pivoted to the body of the bearing at 51 and received in a slot 52 in the cap. It has a nut 53 threaded thereto for clamping the cap to the bearing.

The bearing is provided with a threaded shank 54 adjustable axially in bearings 55, 56, by means of a nut 57, which rests on the bearing 56, for permitting the roller 41 to rise and fall with the form rollers thereunder in the operation of the machine.

Rotation is imparted to the distributing roller by its frictional contact with the form roller when the latter is rotating, and means may also be provided whereby the frictional contact is supplemented by rotating means acting upon the ink distributing shell. These last-named rotating means are preferably so arranged as to supplement but not to interfere with the frictional contact between my improved distributing roller and the form rollers or other composition rollers with which they coact. These rotating means are exemplified as a gear 61, which is fixed to the sleeve 44. The sleeve is journaled by bearings 62, 63, shown as bushings, about the rod, and fixed in the sleeve. The bushings hold the inner periphery of the sleeve out of contact with the rod. The sleeve is held in endwise relation to the rod by means of collars 64, 65, fixed to the rod, as by means of set-screws 66, 67.

A bearing 69 is received about the sleeve. The ink distributing shell is fixed to this bearing, as by means of countersunk screws 70 passing through the shell and threaded into one of the flanges 71 of the bearing 69, the outer faces of these screws being finished so as to become part of the periphery of the ink distributing shell. The bearing is provided with key-grooves 72 and the sleeve is provided with spline groove 73.

Keys 74 are received in the mating grooves and held securely endwise to the bearing by means of their heads 75.

The sleeve is reduced in diameter at its outer end to form a shoulder 76. The gear 61 is received over this reduced end against said shoulder. Keys 77 are located in the outer reduced ends of the grooves 73 and in mating grooves in the gear 61. The gear and keys are securely held endwise between said shoulder and the collar 64.

Gears 81 fixed to the axles of the form rollers, mesh with the gear 61, and are in turn meshed by a rack 82 fixed to and extending lengthwise of the reciprocating bed. In this manner the reciprocations of the bed are imparted to the gears 81, and by them to the gear 61, whereby the ink distributing shell is rotated in opposite directions in unison with the opposite rotations of the form rollers and with the opposite reciprocations of the bed. The form on the bed passes beyond the form rollers in each of its directions of movement, so as to be distant therefrom when the reversals of the reciprocating movements in the form rollers take place, so as to provide for greater evenness of ink transference from the form rollers to the form.

Endwise reciprocation is imparted to the ink distributing shell. The bearing 69 forms an endwise slidable bearing, slidable endwise on the sleeve 44. Accurate limits for endwise movements of the reciprocating ink distributing shell are provided by washers 83, 84, at the ends of the reciprocating movements of the bearing 69, these washers being arranged to receive the endwise thrusts of the keys 74, and are arranged to be readily replaced in case of wear. One of these washers is shown received about the sleeve against the gear 61, and the other of the washers is shown received against a shoulder 85 in an annular groove 86 of the collar 65.

The bearing 69 is provided with the flanges 71, between which there is an annular groove 87 for forming a lubricant pocket between the inner wall 88 of said bearing and the outer shell. The outer flange is provided with an end hole 89 communicating with the pocket. This hole is threaded and arranged to receive a plug 90 for closing the opening. The supply of lubricant for the pocket is received through this hole. Registering lubricant passages 91 extend through the inner wall of said bearing, the keys 74, the sleeve and the inner bushing, for supplying lubricant to the outer surface of the sleeve on which the bearing slides, and to the journal surface on which said sleeve rotates.

To impart endwise movement to the ink distributing shell, referring to Figs. 2 to 9 inclusive, the rod is provided with a helical thread 95, forming a continuous helical space 96. The turns of the thread are separated by the spaces thus formed. This thread and the sleeve 44 may be of any desirable length to suit the length of endwise reciprocating movement which is to be imparted to the ink distributing shell.

The shell is provided with a bearing 97 having end flanges 98. The bearing may at one or both sides thereof be provided with a recess 99 between longitudinal flanges 100, between which pockets 101 are located, forming lubricant pockets, from which holes 104 communicate with the interior of the bearing and the screw therein.

The shell is shown fixed to the bearing 97 by means of countersunk screws 102, which pass through the shell and are threaded in said flanges, the outer ends of said screws being finished to form part of the ink distributing surface of the shell.

The outer end of the bearing 97 is provided with a recess 103 of which the recess 99 forms an extension. The recess 99 is in the form of a longitudinal slot. There is one of these recesses and one of these slots shown at each side of the rod, the recesses merging into each other.

A shoe 105, having a portion of a thread 106 thereon, is arranged to be received in one of the recesses 103, the thread portion thereof being received in the thread-space on the rod.

A spring 107 is received in the recess 99. This spring is shown as comprising a plurality of leaves secured to a block 108, as by rivets 109. A pin 110 extends from the block. The spring assembly, consisting of the spring leaves, the block and the pin, is arranged to be placed endwise in the slot between the bottom of the slot and the shell, the pin 110 being received in the end wall of the slot and aiding in locating the spring assembly and preventing tipping of the block. The outer end of the spring is arranged to press the shoe toward the thread 95. This arrangement of spring enables a long spring with great resilient yielding powers to be employed, thus avoiding crystallization, and insuring long life to the spring. The shoe is loosely received in the recess so as to move freely in radial direction and to accommodate itself to the thread. The spring assembly is readily removable by pulling the same endwise out of its slot.

A plate 111 is received across the end of the bearing 97 for closing said recesses and confining the shoe and the spring. The outer edge of this plate is shown substantially coincident with the outer periphery of the ink distributing shell. This plate is releasably secured to the bearing 97, as by means of countersunk screws 112 passing through said plate and threaded into the bearing 97. The threaded holes in which the screws are received may extend inwardly to communicate with the oil pocket in said bearing, so that by removal of one of the screws, the oil in said oil pocket may be replenished.

In the modification shown in Figs. 10 and 11, similar parts are designated by similar but primed reference numerals. In this modification the spring is shown as a helical spring 115 and the longitudinal flanges of the bearing 97 are omitted, forming the pocket 101' as a continuous annular lubricant pocket. The helical spring is received in recess 99', which communicates with the recess 103'.

Means are provided, preferably at each end of the thread 95, for permitting continued rotation of the shell without interference between the shoe and the thread. This is provided for the purpose of insuring that reversal of endwise reciprocation of the ink distributing shell shall take place beyond the range of contact between the form roller and the form, and at the time of reversal of reciprocation of the bed of the machine, so that no indication of such reversal of the distributing roller may be transferred to the inking of the form.

The means employed are instanced as cams 121 at the respective ends of the thread on the rod. These cams are located in annular grooves 122 in the rod, between the ends of the thread and shoulders 123 of the rod. The cams are provided with shoulders 124, to direct the thread of the shoe into the thread-space of the rod upon reversals of rotation of the shell. The shoe is moved radially by the respective cams in the annular grooves 122. The endwise movement of the shell in one direction ceases when said shoe has thus ridden out of the thread-space into the annular groove. When the reversal of direction of rotation of the shell takes place, the shoe will again find the thread-space by contact with the shoulder 124 of the cam, the shoe riding against said shoulder into the thread.

The limit of end reciprocation of the shell upon the rod and of the shoe with relation to the thread is determined by the endwise reciprocation permitted between the washers 83, 84, when the sleeve 44 is employed.

A further modification of my improved device is exemplified in Fig. 12 in which similar parts are designated by similar but primed reference numerals. In this modification the rotary driving means for the endwise reciprocating ink distributing roller are omitted. In this exemplification, the gear 61, the sleeve 44 and its bearings, the collars 64, 65, the washers 83, 84, keys 74, 77, are omitted, and the rod extends in equal diameter to form a guide journal 125 throughout the extent of endwise movement of an endwise reciprocating bearing 69', which takes the place of the bearing 69, and is constructed similarly thereto, and secured to the shell in similar manner. The bearing 69', however, has an inner bearing face which slides along and rotates on the guide journal 125.

Means for reciprocating the ink distributing shell on the rod are the same as those described in connection with the exemplification shown in Figs. 1 to 9 inclusive. They are designated by similar reference numerals and further description of the same is not necessary.

Endwise reciprocating means other than those herein shown and described are employable in connection with the rotary driving means herein shown and described, another of such endwise reciprocating means being shown, described and claimed in my copending application filed March 4, 1926, as Serial No. 92,277.

The endwise reciprocating means herein shown and described are particularly applicable for employment in ink distributing rollers used on presses employing reciprocating beds, in which the directions of rotation of the rollers are reversed, although the driving means herein shown, described and claimed are also employable in connection with endwise reciprocating means in so-called rotary presses, wherein the rollers continuously rotate in one direction, as exemplified in my aforesaid copending application.

In my improved device the parts are readily replaced in case of wear or accident. Thus the shoe is readily accessible by removal of the end-plate 111, accomplished by simple removal of the screws 112, which exposes the shoe and its spring to view and makes the same readily removable and replaceable. If it is desired to renew the washers 83, 84, the collar 64 is readily removed by unclamping the set-screw 66. The gear 61 is readily removable by the removal of the keys 77, whereupon the shell is removable endwise by slipping it together with its keys off of the end of the inner sleeve. The inner sleeve together with its gear is also readily removable endwise off of the rod, whereupon the keys 74 are readily removable, and the washer 84 and the collar 65 are exposed. All of the parts are thus exposed to ready view and ready removal, so that they may be repaired and replaced or new parts substituted.

My improved device provides for exceedingly fine and even distribution of the ink, permits long endwise reciprocations of the distributing roller to be had within minimum endwise space, and provides novel means whereby dense covering of the printing surfaces may be obtained with a minimum amount of ink.

The end of the shell and the end plate 111 are annularly relieved, being shown rounded at 126, 127, so as to relieve end contact between the distributing roller and the coacting composition roller.

Having thus fully described my invention what I claim as new, and desire to secure by Letters Patent, is:

1. In an ink distributing roller, the combination of an ink distributing rotatable shell comprising a bearing, a rod whose longitudinal axis is coincident with the axis of rotation of said shell, said rod having a threaded portion in said bearing, means restraining rotation of said rod, a shoe in said bearing received in the thread-space of the threaded portion, and a releasable end-plate received across the end of said bearing and holding said shoe in said bearing.

2. In an ink distributing roller, the combination of an ink distributing rotatable shell comprising a bearing fixed with relation thereto, a rod whose longitudinal axis is coincident with the axis of rotation of said shell, said rod having a threaded portion in said bearing, means restraining rotation of said rod, the outer end of said bearing provided with a recess, a directing shoe in said recess, said directing shoe extending into the thread-space of said threaded portion, a cover-plate releasably received across the end of said bearing and closing said recess for confining said shoe, and means releasably securing said cover-plate in place, and constructed and arranged whereby to remove said shoe whilst maintaining said recessed bearing in fixed relation to said shell.

3. In an ink distributing roller, the combination of an ink distributing rotatable shell comprising a bearing, a rod whose longitudinal axis is coincident with the axis of rotation of said shell, said rod having a threaded portion in said bearing, means restraining rotation of said rod, the outer end of said bearing provided with opposite recesses at opposite sides of said threaded portion and with extensions of said recesses between said recesses and said shell, a directing shoe arranged to be selectively placed in said recesses with its inner end received in the thread-space of said threaded portion, a spring selectively received in said extensions for coaction with said shoe, a cover-plate releasably received across the end of the said bearing and closing said recesses and extensions, and means releasably securing said cover-plate in place.

4. In an ink distributing roller, the combination of an ink distributing rotatable shell comprising a bearing, a rod whose longitudinal axis is coincident with the axis of rotation of said shell, said rod having a threaded portion in said bearing, means restraining rotation of said rod, the outer end of said bearing provided with a recess and said bearing provided with a lubricant pocket communicating with its periphery, a directing shoe in said recess received in the thread-space of said threaded portion, a releasable end-plate across the end of said bearing for releasably holding said shoe in said recess, said bearing provided with an end threaded hole communicating with said lubricant pocket, and a screw in said threaded hole securing said end-plate in place.

5. In an ink distributing roller, the combination of an ink distributing rotatable shell, a bearing therein, a rod whose longitudinal axis is coincident with the axis of rotation of said shell, said rod having a threaded portion in said bearing, means restraining rotation of said rod, means securing said bearing in said shell, the outer end of said bearing provided with a recess, a directing shoe in said recess, said directing shoe extending into the thread-space of said threaded portion, a cover-plate releasably received across the end of said bearing and across the end of said shell for closing said recess and confining said shoe, and means releasably securing said cover-plate in place, and constructed and arranged whereby to remove said shoe whilst maintaining said recessed bearing in fixed relation in said shell.

6. In an ink distributing roller, the combination of an ink distributing shell comprising a bearing, a rod comprising a threaded portion whose longitudinal axis is coincident with the axis of rotation of said shell, a directing shoe received in said threaded portion, said bearing provided with a longitudinal recess, a leaf-spring extending lengthwise of the axis of said bearing and removably received in said longitudinal recess and acting to press said shoe toward said threaded portion, and a releasable end-plate at the outer end of said bearing.

7. In an ink distributing roller, the combination of an ink distributing shell comprising a bearing, a rod comprising a threaded portion whose longitudinal axis is coincident with the axis of rotation of said shell, a directing shoe received in said threaded portion, said bearing provided with a longitudinal recess, a spring assembly comprising a positioning and a leaf-spring secured thereto, said spring assembly having slide connection with the walls of said longitudinal recess, a positioning pin between the end of said spring assembly and the end wall of said longitudinal recess, said spring assembly acting to press said shoe toward said threaded portion, and a releasable end-plate at the outer end of said bearing.

8. In an ink distributing roller, the combination of an ink distributing shell, a sleeve and a rod, all telescopingly arranged, rotary driving means between said sleeve and said shell, and axial driving means between said shell and said rod.

9. In an ink distributing roller, the combination of an ink distributing shell, a sleeve and a rod, all telescopingly arranged, said sleeve journaled about said rod, releasable means maintaining endwise relation between said sleeve and said rod, said ink distributing shell slidable endwise on said sleeve, releasable means limiting said endwise movements, rotary driving means between said sleeve and said shell, and axial driving means between said shell and said rod, and constructed and arranged whereby said shell, said sleeve and said rod are separated by endwise movements between the same.

10. In an ink distributing roller, the combination of an ink distributing shell, a sleeve and a rod, all telescopingly arranged, said sleeve journaled about said rod, releasable means maintaining endwise relation between said sleeve and said rod, said ink distributing shell slidable endwise on said sleeve, releasable means limiting said endwise movements, removable end-stops between said sleeve and said rod, rotary driving means between said sleeve and said shell, and axial driving means between said shell and said rod, and constructed and arranged whereby said shell, said sleeve and said rod are separated by endwise movements between the same.

11. In an ink distributing roller, the combination of an ink distributing rotatable and endwise movable shell, a sleeve in said shell, a rod in said sleeve, a rotary driving connection between said sleeve and said shell permitting axial telescoping movement of said shell about said sleeve, and axial driving means between said shell and said rod.

12. In an ink distributing roller, the combination of a rod, a rotatable sleeve journaled about said rod, collars on said rod holding said sleeve in axial directions on said rod, rotary driving means on the outer end of said sleeve, an ink distributing shell telescopingly arranged about said sleeve, said shell comprising a slide-bearing on said sleeve, spline groove and key connections between said bearing and said sleeve, axial driving means between said shell and said rod for moving said shell and said bearing axially, and removable thrust washers about said sleeve respectively at said gear and at the inner one of said collars arranged to be engaged by the spline keys of said spline groove and key connection for limiting the axial movements of said slide-bearing.

In testimony whereof, I have hereunto signed my name.

FRANK TEMMEN.